(12) United States Patent
Sakaguchi et al.

(10) Patent No.: US 7,167,306 B2
(45) Date of Patent: Jan. 23, 2007

(54) TRANSMISSIVE SCREEN AND REAR PROJECTOR

(75) Inventors: Masafumi Sakaguchi, Suwa (JP); Hideto Yamashita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 69 days.

(21) Appl. No.: 10/647,302

(22) Filed: Aug. 26, 2003

(65) Prior Publication Data

US 2004/0075900 A1 Apr. 22, 2004

(30) Foreign Application Priority Data

Aug. 30, 2002 (JP) ............................. 2002-255256
Mar. 7, 2003 (JP) ............................. 2003-062066

(51) Int. Cl.
*G03B 21/60* (2006.01)
*G03B 21/56* (2006.01)

(52) U.S. Cl. ..................... 359/457; 359/453; 359/455; 359/459; 359/460

(58) Field of Classification Search ............... 359/443, 359/452–457, 459–460
See application file for complete search history.

(56) References Cited

U.S. PATENT DOCUMENTS

| | | | |
|---|---|---|---|
| 4,730,897 A | 3/1988 | McKechnie et al. | 359/452 |
| 5,477,380 A | 12/1995 | Watanabe et al. | 359/457 |
| 5,615,045 A | 3/1997 | Takuma et al. | 359/456 |
| 5,644,431 A * | 7/1997 | Magee | 359/619 |
| 5,694,246 A * | 12/1997 | Aoyama et al. | 359/619 |
| 5,760,955 A | 6/1998 | Goldenberg et al. | 359/456 |
| 5,933,276 A * | 8/1999 | Magee | 359/455 |
| 6,046,855 A | 4/2000 | Goto | 359/619 |
| 6,297,540 B1 * | 10/2001 | Assadi et al. | 257/432 |
| 6,335,828 B1 * | 1/2002 | Hashimoto et al. | 359/443 |
| 6,392,726 B1 | 5/2002 | Goto et al. | 349/86 |
| 6,436,265 B1 | 8/2002 | Shimada et al. | 205/125 |
| 6,788,460 B1 * | 9/2004 | Knox et al. | 359/456 |
| 6,897,911 B1 * | 5/2005 | Yamaguchi | 349/57 |
| 2001/0001582 A1 | 5/2001 | Walker | 359/443 |
| 2003/0137729 A1 | 7/2003 | Goto et al. | 359/457 |
| 2004/0070845 A1 * | 4/2004 | Karasawa et al. | 359/742 |
| 2004/0075898 A1 * | 4/2004 | Sakaguchi et al. | 359/456 |
| 2004/0075900 A1 | 4/2004 | Sakaguchi et al. | 359/457 |

FOREIGN PATENT DOCUMENTS

| | | |
|---|---|---|
| JP | A 59-126523 | 7/1984 |
| JP | 11-312921 | 11/1999 |
| JP | 2000-131506 | 5/2000 |
| JP | A 2000-131506 | 5/2000 |
| JP | A 2000-332226 | 11/2000 |

(Continued)

*Primary Examiner*—W. B. Perkey
*Assistant Examiner*—Magda Cruz
(74) *Attorney, Agent, or Firm*—Oliff & Berridge, PLC

(57) ABSTRACT

The present invention provides an excellent transmissive screen allowing a well-balanced increase in the vertical, horizontal, and oblique viewing angle characteristics for enhancing the viewing angle characteristics, and a rear projector including the transmissive screen. A transmissive screen can include a Fresnel lens portion having Fresnel lens components on its light-exiting surface, and a microlens array portion disposed at the light-exiting surface side of the Fresnel lens portion and having many microlenses on its light-incident surface. The microlenses of the microlens array portion are arrayed vertically and horizontally such that adjacent microlenses have common sides and the microlens array portion is rotated by 45°.

13 Claims, 13 Drawing Sheets

FOREIGN PATENT DOCUMENTS

| | | |
|---|---|---|
| JP | A 2001-102556 | 4/2001 |
| JP | 2001-133888 | 5/2001 |
| JP | A 2001-305315 | 10/2001 |
| JP | A 2002-174703 | 6/2002 |
| JP | A 2002-196106 | 7/2002 |
| WO | WO 00/76002 A1 | 12/2000 |

* cited by examiner (a)

(b)

TRANSMISSIVE SCREEN AND REAR PROJECTOR

BACKGROUND OF THE INVENTION

1. Field of Invention

The present invention is related to transmissive screens and rear projectors.

2. Description of Related Art

Rear projectors have progressively seen higher demand and been utilized more frequently as suitable displays for devices, such as home theater monitors and wide-screen television sets.

FIG. 10 illustrates the optical system of a rear projector. This rear projector 14 has a housing 50 including an optical projecting unit 20 for projecting an image, a light-guide mirror 30 for guiding the image projected by the optical projecting unit 20, and a transmissive screen 42 on which the image guided by the light-guide mirror 30 is projected.

This rear projector 14 particularly requires a transmissive screen 42 with wider viewing angle characteristics. Japanese Unexamined Patent Application Publication No. 2000-131506 (FIGS. 1 to 5) discloses such a transmissive screen with wider viewing angle characteristics. FIG. 11 is a sectional view of the transmissive screen. This transmissive screen 800 can include a Fresnel lens portion 810 can have Fresnel lens components on its light-exiting surface, a microlens array portion 820 disposed at the light-exiting surface side of the Fresnel lens portion 810 and having many microlenses 820a on its light-incident surface, a light shield portion 840 disposed at the light-exiting surface side of the microlens array portion 820, and a diffusing sheet 850 disposed at the light-exiting surface side of the light shield portion 840.

FIGS. 12 to 14 illustrate the structures of microlenses disclosed in Japanese Unexamined Patent Application Publication No. 2000-131506 (FIGS. 1 to 5). FIG. 12 shows rhombic microlenses, FIG. 13 shows a combination of rhombic microlenses and a hexagonal microlens, and FIG. 14 shows rectangular microlenses. In FIGS. 12 to 14, each (a) is a front view of the light-incident surfaces of these microlenses, while each (b) is a front view of the light-exiting surfaces of these microlenses; apertures 840a are arranged in the light shield portion 840, as shown in these drawings.

Japanese Unexamined Patent Application Publication No. 2001-133888 (FIGS. 3 and 4) also discloses such a transmissive screen with wider viewing angle characteristics. FIG. 15 is a perspective view of the transmissive screen. This transmissive screen 900 can have many spherical light-diffusing particles 920a arrayed vertically and horizontally. The light-diffusing particles 920a diffuse image light incident on the transmissive screen 900 to emit.

The above transmissive screens 800 and 900 have the advantage of better vertical viewing angle characteristics over known transmissive screens using lenticular lenses. This advantage is derived from the refraction of the microlenses 820a or the light-diffusing particles 920a.

However, there is a need for a well-balanced increase in the vertical, horizontal, and oblique viewing angle characteristics in order to enhance the viewing angle characteristics for the above transmissive screens 800 and 900.

SUMMARY OF THE INVENTION

Accordingly, an object of the present invention is to provide a transmissive screen allowing a well-balanced increase in the vertical, horizontal, and oblique viewing angle characteristics for enhancing the viewing angle characteristics, and a rear projector including such an excellent transmissive screen.

The present invention provides the possibility of a well-balanced increase in the vertical, horizontal, and oblique viewing angle characteristics to enhance the viewing angle characteristics by arraying microlenses vertically and horizontally in such a way that adjacent microlenses have common sides and rotating the array by 45°.

A transmissive screen according to the present invention can include a Fresnel lens portion having Fresnel lens components on its light-exiting surface, and a microlens array portion disposed at the light-exiting surface side of the Fresnel lens portion and having many microlenses on its light-incident surface. The microlens array portion can have the microlenses arrayed vertically and horizontally such that adjacent microlenses have common sides and the array is rotated by 45°.

According to the transmissive screen of the present invention, the microlens array portion, in which adjacent microlenses have common sides, can eliminate or reduce non-lens regions, which may exist in the spaces between the microlenses. As a result, the microlenses of the microlens array portion can have a larger effective area to enhance the light diffusion efficiency.

As described above, the microlens array is rotated by 45° in the transmissive screen of the present invention. The microlens array, when assembled in the transmissive screen, can have larger array pitches in the vertical and horizontal directions of the transmissive screen compared when it is not rotated. Thus, permitting a larger vertical and horizontal entrance pupil in each microlens. Through such operation, each microlens peripheral region (which is absent in the oblique directions of the screen) can provide a higher refraction to generate sufficient light diffusion in the vertical and horizontal directions of the screen. The refraction of each microlens can also provide a certain amount of light diffusion in the oblique directions of the screen.

As a result, the transmissive screen can provide a well-balanced increase in the vertical, horizontal, and oblique viewing angle characteristics to enhance the viewing angle characteristics.

In the transmissive screen described above, the microlenses can preferably have larger vertical and horizontal array pitches than oblique array pitches at an angle of 45°. In such a structure, each microlens can provide higher refraction in the vertical and horizontal directions of the transmissive screen than in the oblique directions of the transmissive screen to generate sufficient light diffusion. This transmissive screen, therefore, ensures viewing angle characteristics required for transmissive screens to provide higher light diffusion in the vertical and horizontal direction of the transmissive screen than in the oblique directions of the transmissive screen.

In the transmissive screen described above, the microlenses can preferably range from 10 to 150 μm in diameter. The microlenses are set to 150 μm or less in diameter because the resolution decreases for excessively large microlenses relative to pixels projected on the transmissive screen. From this point of view, the microlenses are more preferably 100 μm or less and most preferably 80 μm or less in diameter. On the other hand, the microlenses are set to 10 μm or more in diameter for the sake of simplicity of manufacture. From this point of view, the microlenses are more preferably 20 μm or more, and most preferably 30 μm or more in diameter. The diameter herein indicates that of microlenses isolated from each other, that is, arrayed in such a way that adjacent microlenses do not have common sides.

The transmissive screen described above can preferably further include a light diffusing portion disposed between the Fresnel lens portion and the microlens array portion. In such a structure, the light diffusing portion can decrease the regularity of light incident on each microlens (in intensity, angle, and phase, for example) to effectively suppress the generation of light diffraction in the microlens array portion.

In addition, since the light diffusing portion can diffuse light passing through the Fresnel lens portion, so that the light can enter the microlens array portion, the generation of a regular interference pattern can be suppressed. This can lead to effectively suppress moire fringing in the Fresnel lens portion and the microlens array portion.

The transmissive screen described above can preferably further include a diffusing sheet disposed at the light-exiting surface side of the microlens array portion. In such a structure, the diffusing sheet can convert light passing through the microlenses into light with specific viewing angle characteristics.

The transmissive screen described above can preferably further include a light shield member disposed between the microlens array portion and the diffusing sheet. The light shield member has apertures near focal points of the microlenses. In such a structure, the light shield member can effectively suppress the reflection of external light, thus increasing image contrast.

A rear projector according to the present invention can include an optical projecting unit and a transmissive screen as described above. The transmissive screen in the rear projector can allow a well-balanced increase in the vertical, horizontal, and oblique viewing angle characteristics to enhance the viewing angle characteristics. The present invention, therefore, can provide an excellent rear projector having better viewing angle characteristics with a well-balanced increase in vertical, horizontal, and oblique viewing angle characteristics.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
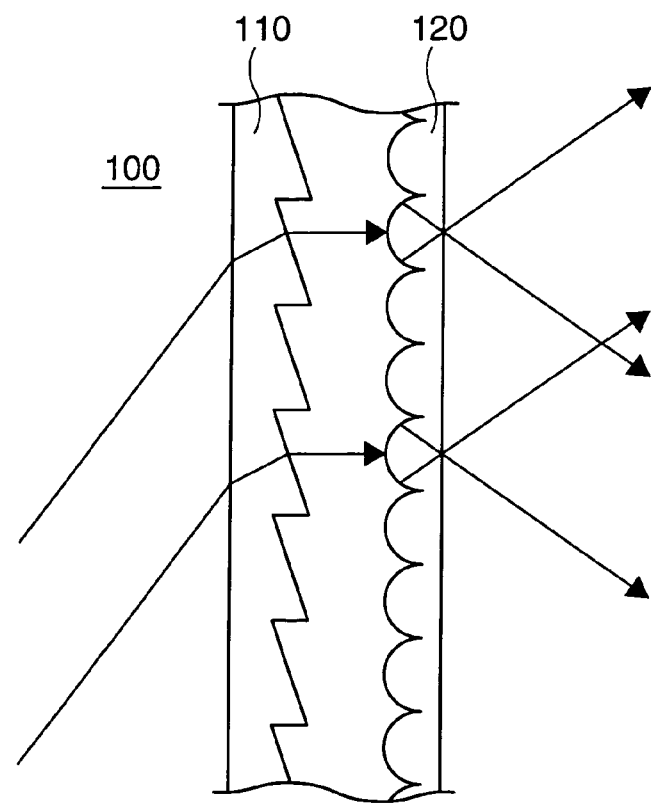
FIG. 1 illustrates the structure of an exemplary transmissive screen according to a first embodiment of the present invention.
Figure 1:
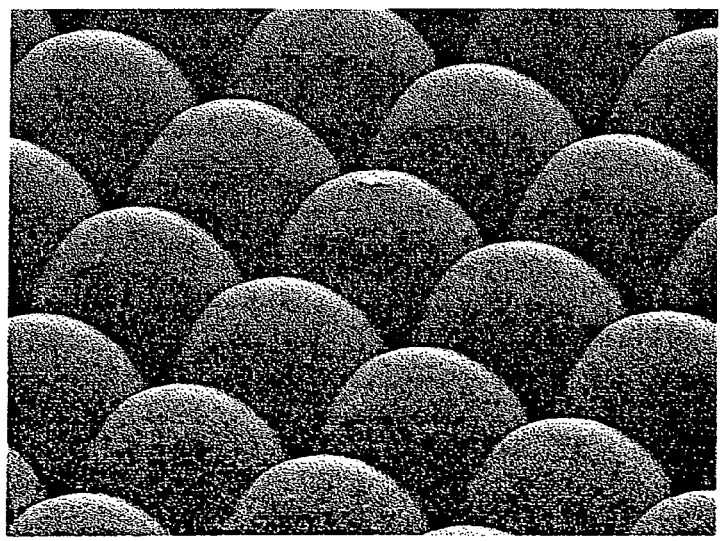
Figure 2:
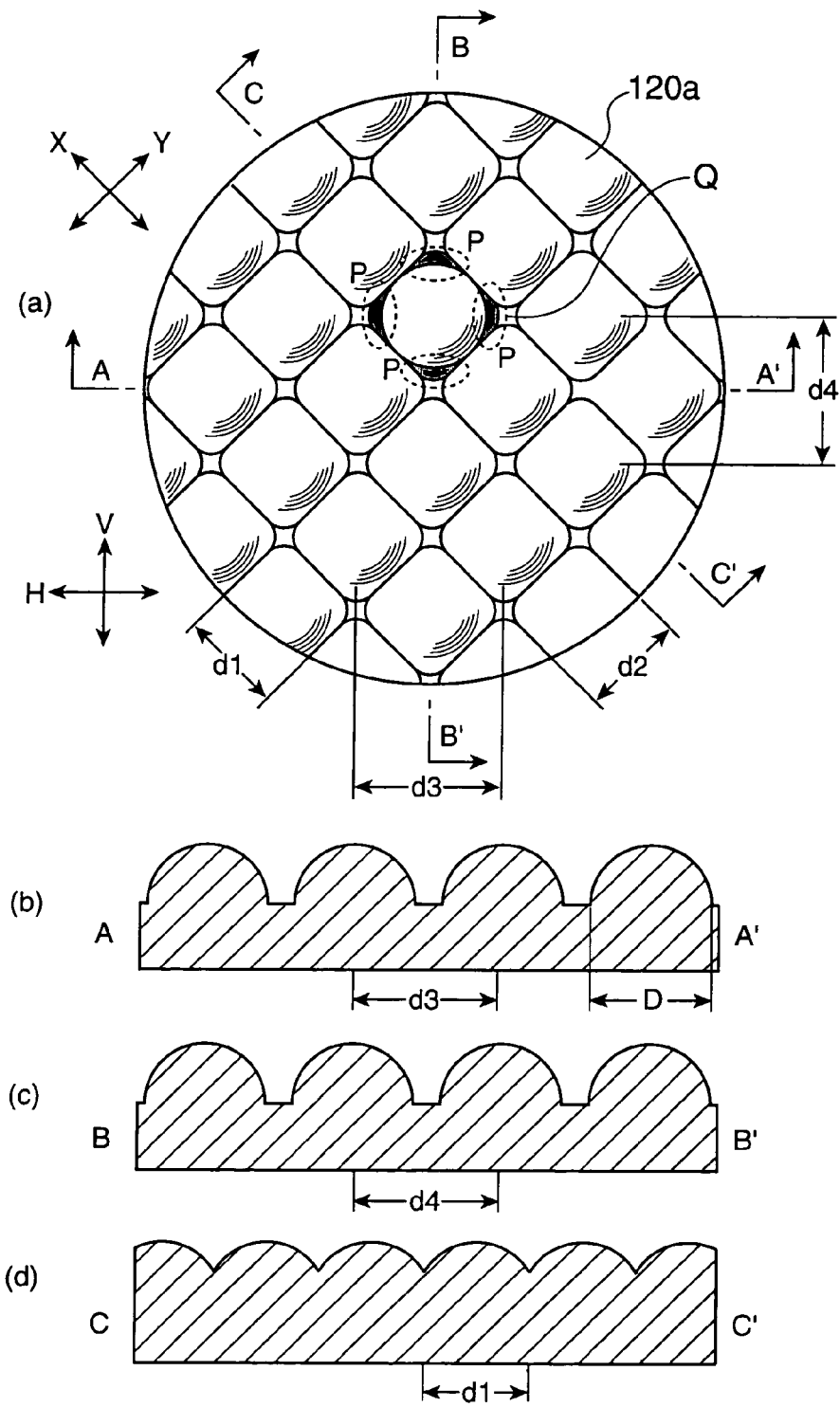
FIG. 2 illustrates the structure of an exemplary transmissive screen according to the first embodiment of the present invention.

Embodiments according to the present invention will now be described with reference to the attached drawings. FIG. 1 illustrates the structure of a transmissive screen according to a first embodiment. FIG. 1(a) is a sectional view of the transmissive screen according to the first embodiment. FIG. 1(b) is an SEM photograph of a surface of a microlens array portion in the first embodiment. FIG. 2 also illustrates the structure of the transmissive screen according to the first embodiment.

FIG. 2(a) is a plan view of a surface structure of the microlens array portion according to the first embodiment. FIGS. 2(b), 2(c), and 2(d) are sectional views taken along lines A–A', B–B', and C–C', respectively, in FIG. 2(a).

Referring to FIGS. 1 and 2, this transmissive screen 100 can include a Fresnel lens portion 110 having Fresnel lens components on its light-exiting surface and a microlens array portion 120 disposed at the light-exiting surface side of the Fresnel lens portion 110 and having many microlenses 120a on its light-incident surface. The microlens array portion 120 has a structure in which the microlenses 120a are arrayed vertically and horizontally such that adjacent microlenses 120a have common sides and the microlens array portion 120 is rotated by 45°.

According to the transmissive screen 100, therefore, the microlens array portion 120 in which adjacent microlenses 120a have common sides can eliminate or reduce non-lens regions Q, which may exist in the spaces between the microlenses 120a. Each microlens may thus have a substantially four-sided shape, with adjacent sides within a microlens being perpendicular to each other, as shown in FIG. 2. As a result, the microlenses 120a of the microlens array portion 120 can have a larger effective area to enhance the light diffusion efficiency.

As described above, the microlens array portion 120 is rotated by 45° in the transmissive screen 100. The microlens array portion 120, when assembled in the transmissive screen 100, can have larger array pitches in the vertical and horizontal directions (VH directions) of the transmissive screen 100 compared when it is not rotated, permitting a larger vertical and horizontal (VH directional) entrance pupil in each microlens 120a. Thus, each microlens peripheral region P (which is absent in the oblique directions of the screen) can provide a higher refraction to generate sufficient light diffusion in the vertical and horizontal directions (VH directions) of the transmissive screen 100. On the other hand, the refraction of each microlens 120a can also provide a certain amount of light diffusion in the oblique directions (XY directions) of the transmissive screen 100.

As a result, the transmissive screen 100 can provide a well-balanced increase in the vertical, horizontal, and oblique viewing angle characteristics to enhance the viewing angle characteristics.

In the transmissive screen 100 according to the first embodiment, the microlenses 120a can have larger array pitches (d3 and d4) in the vertical and horizontal directions (VH directions) than those (d1 and d2) in the oblique directions (XY directions) at an angle of 45°.

Each microlenses 120a can provide higher refraction in the vertical and horizontal directions (VH directions) of the transmissive screen 100 than in the oblique directions (XY directions) of the transmissive screen 100 to generate sufficient light diffusion. This transmissive screen 100, therefore, can ensure viewing angle characteristics required for transmissive screens to generate higher diffusion in the vertical and horizontal directions (VH directions) of the transmissive screen than in the oblique directions (XY directions) of the transmissive screen.

These microlenses 120a may be arrayed more densely in the X and Y directions to eliminate the non-lens regions Q which may exist in the spaces between adjacent microlenses 120a in the vertical and horizontal directions (VH directions) of the screen. This arrangement can improve the light usage and provide more desirable viewing angle characteristics for transmissive screens of rear projectors.

The microlenses for the microlens array portion 120 are 40 μm in diameter. These microlenses avoid deterioration of the display quality attributed to a decreased resolution. These microlenses, arrayed vertically and horizontally with no space in the microlens array portion 120, have vertical and horizontal array pitches of 30 μm or less.

In the transmissive screen 100 according to the first embodiment, the microlens array portion 120 can have a structure in which the microlenses 120a are arrayed vertically and horizontally such that adjacent microlenses 120a have common sides and the microlens array portion 120 is rotated by 45°. Although, the microlens array portion 120 may have another structure, such as that shown in FIG. 3.

Figure 3:
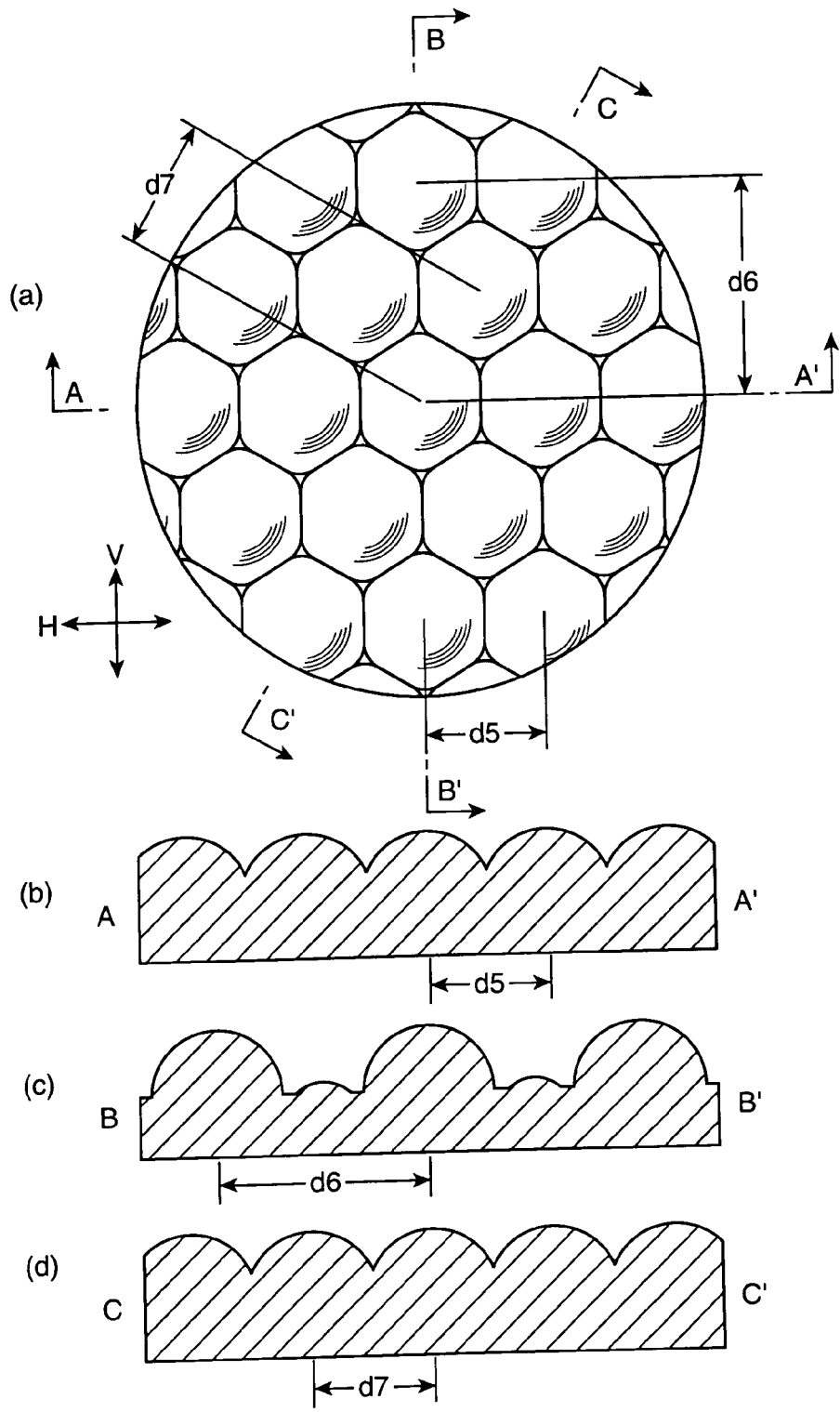
FIG. 3 illustrates the structure of an exemplary transmissive screen according to a comparative embodiment of the present invention.

FIG. 3 illustrates the structure of a transmissive screen according to a comparative embodiment. FIG. 3(a) is a plan view of a surface structure of a microlens array portion according to the comparative embodiment. FIGS. 3(b), 3(c), and 3(d) are sectional views taken along lines A–A', B–B', and C–C', respectively, in FIG. 3(a).

As shown in FIG. 3, this microlens array portion has a structure in which microlenses are arrayed in a honeycomb pattern such that adjacent microlenses have common sides. Thus, the transmissive screen according to the comparative embodiment, having the microlens array portion in which adjacent microlenses have common sides, can also eliminate or reduce non-lens regions Q, which may exist in the spaces between the microlenses. As a result, the microlenses of the microlens array portion can have a larger effective area to enhance the light diffusion efficiency.

However, in the transmissive screen according to the comparative embodiment, as shown in FIGS. 3(b) to 3(d), the microlenses can have a smaller array pitch d5 in the horizontal direction (H direction) of the transmissive screen than that of the transmissive screen 100 according to the first embodiment, thus not allowing a larger entrance pupil in the horizontal direction (H direction) of the transmissive screen in each microlens. On the other hand, in the vertical direction (V direction) of the transmissive screen, the microlenses can have a larger array pitch d6 than that of the transmissive screen 100 according to the first embodiment, providing a larger entrance pupil in the vertical direction (V direction) of the transmissive screen in each microlens. In this case, however, the array pitch d6 of the microlenses in the vertical direction (V direction) of the transmissive screen can be so large as to decrease the resolution of a projected image.

Therefore, the transmissive screen according to the comparative embodiment can have difficulty in providing a well-balanced increase in the vertical, horizontal, and oblique viewing angle characteristics to enhance viewing angle characteristics and can have the drawback of a decreased resolution of a projected image.

On the other hand, the transmissive screen 100 according to the first embodiment can be free from such a drawback and can provide a well-balanced increase, on the whole, in the vertical, horizontal, and oblique viewing angle characteristics to enhance the viewing angle characteristics.

Figure 4:
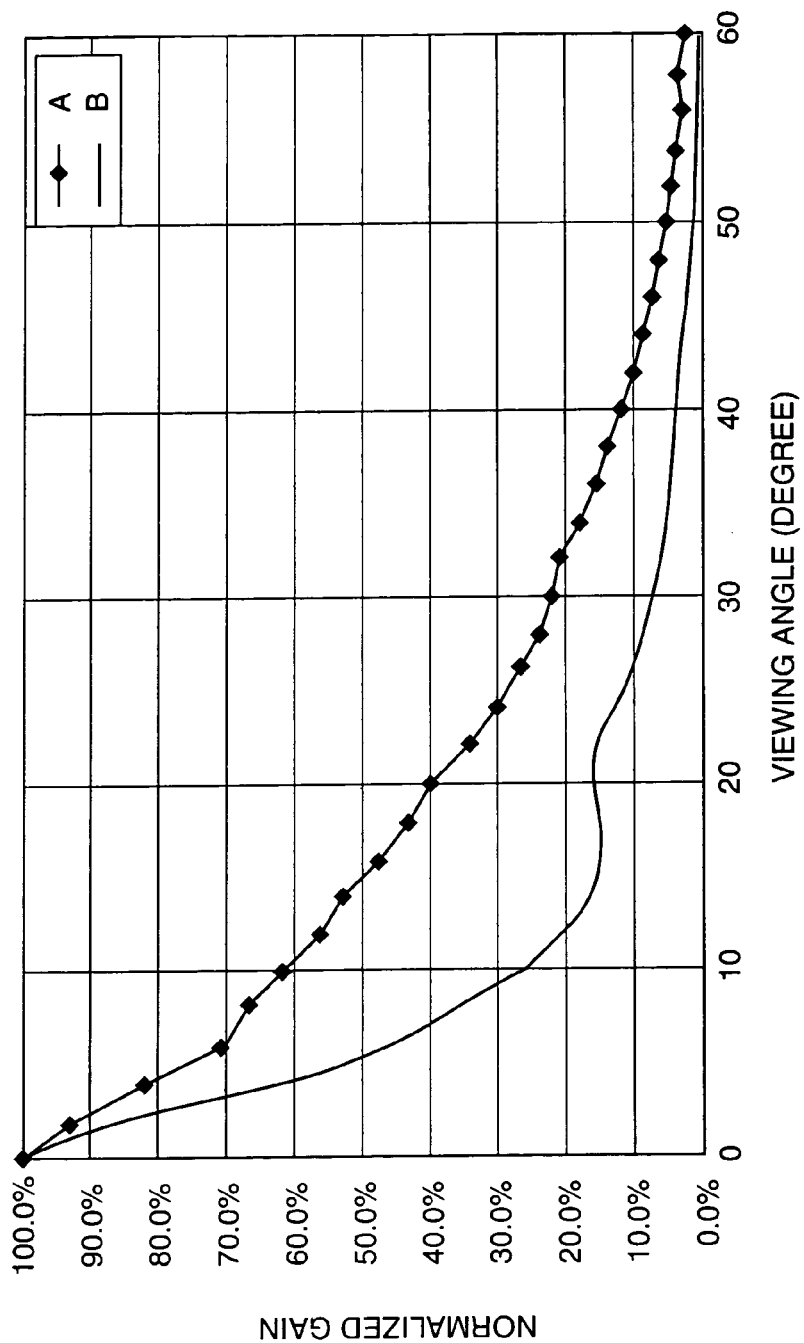
FIG. 4 shows the viewing angle characteristics of an exemplary transmissive screen according to the first embodiment of the present invention.

FIG. 4 illustrates the viewing angle characteristics of the transmissive screen 100 according to the first embodiment of the present invention. In FIG. 4, represents the viewing angle characteristics of the transmissive screen 100 according to the first embodiment, and B represents the viewing angle characteristics of the transmissive screen according to the comparative embodiment. FIG. 4 shows that the transmissive screen 100 according to the first embodiment can have better viewing angle characteristics than the transmissive screen according to the comparative embodiment.

Figure 5:
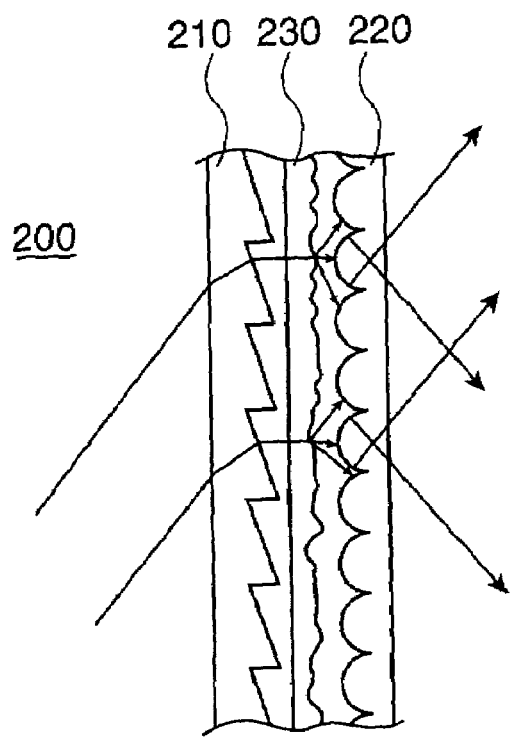
FIG. 5 is a sectional view of an exemplary transmissive screen according to a second embodiment of the present invention.

FIG. 5 illustrates the structure of a transmissive screen according to a second embodiment. As shown in FIG. 5, the transmissive screen 200 according to the second embodiment can include a Fresnel lens portion 210, a microlens array portion 220, and a light diffusing portion 230 disposed between the Fresnel lens portion 210 and the microlens array portion 220.

This light diffusing portion 230 can decrease the regularity of light incident on each microlens (in, for example, intensity, angle, and phase) to effectively suppress the generation of light diffraction in the microlens array portion 220.

The light diffusing portion 230, disposed between the Fresnel lens portion 210 and the microlens array portion 220, can diffuse light passing through the Fresnel lens, and then the light enters the microlens array portion 220. This process can suppress a regular interference pattern, leading to effectively suppress moire fringing generated in the Fresnel lens portion 210 and the microlens array portion 220.

In the transmissive screen 200 according to the second embodiment, the light diffusing portion 230 is a resin sheet of a surface light diffusing type having one rough surface (which can diffuse light substantially at its surface). Since light diffusion can occur at the surface of the resin sheet, it may exhibit the light diffusion function even if the thickness is decreased. This advantage can permit a shorter distance between the Fresnel lens portion 210 and the microlens array portion 220, thus minimizing the generation of ghost images attributed to internal diffusion and can decrease both in contrast and transmittance. This resin sheet is manufactured by transferring a rough surface, formed by sandblasting, of a metallic mold to a resin sheet through casting or extrusion. Thus, a light diffusing portion capable of suppressing the generation of light diffraction and moire fringing to an acceptable level can be manufactured in a relatively simple way.

In the transmissive screen 200 according to the second embodiment, the light diffusing portion 230 can have a haze value of 60%. The light diffusing portion 230 can suppress the generation of fuzziness and defocus as well as light diffraction and moire fringing to an acceptable level.

In the transmissive screen 200 according to the second embodiment, the light diffusing portion 230 can have a gloss value of 20%. The light diffusing portion 230 can suppress the generation of graininess and defocus to an acceptable level, in addition to light diffraction and moire fringing, to an acceptable level.

In the transmissive screen 200 according to the second embodiment, the resin sheet used as the light diffusing portion 230 can have substantially conical irregularities on its surface. The substantially conical irregularities can have a height difference of 5 to 20 μm. Therefore, the resin sheet can suppress the generation of light diffraction and moire fringing to an acceptable level in the transmissive screen 200 according to the second embodiment.

Figure 6:
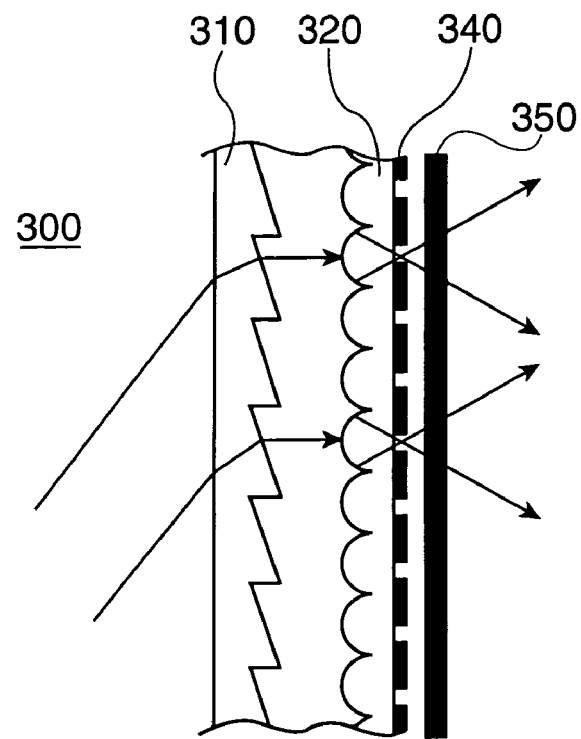
FIG. 6 is a sectional view of an exemplary transmissive screen according to a third embodiment of the present invention.

FIG. 6 illustrates the structure of a transmissive screen according to a third embodiment. As shown in FIG. 6, the transmissive screen 300 according to the third embodiment can include a Fresnel lens portion 310, a microlens array portion 320, a light shield member 340 having apertures near focal points of the microlenses, and a diffusing sheet 350 disposed at the light-exiting surface side of the light shield member 340.

In the transmissive screen 300 according to the third embodiment, the light shield member 340 can suppress the reflection of external light effectively to increase image contrast. In addition, the diffusing sheet 350 can convert light passing through the microlenses into light having specific viewing angle characteristics.

Figure 7:
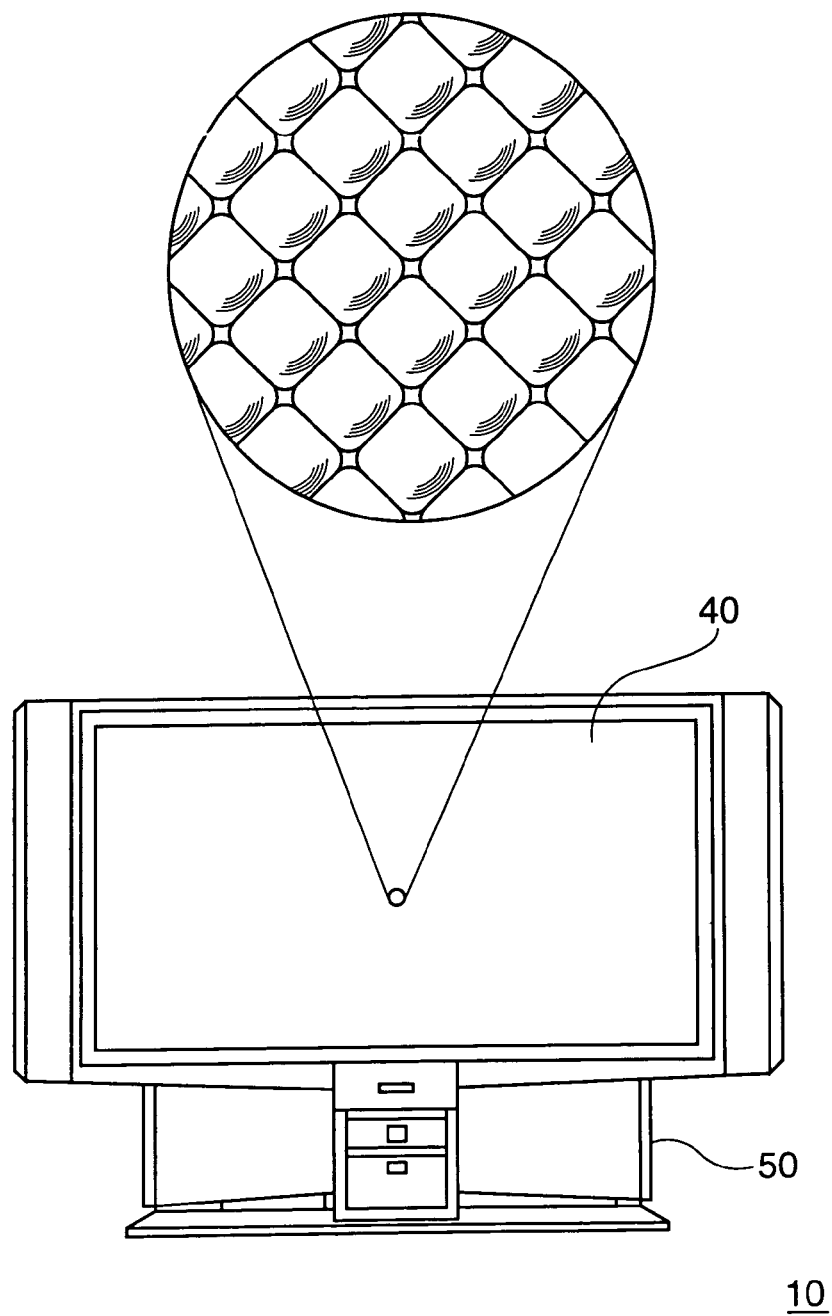
FIG. 7 is an external view of an exemplary rear projector according to a fourth embodiment of the present invention.
Figure 8:
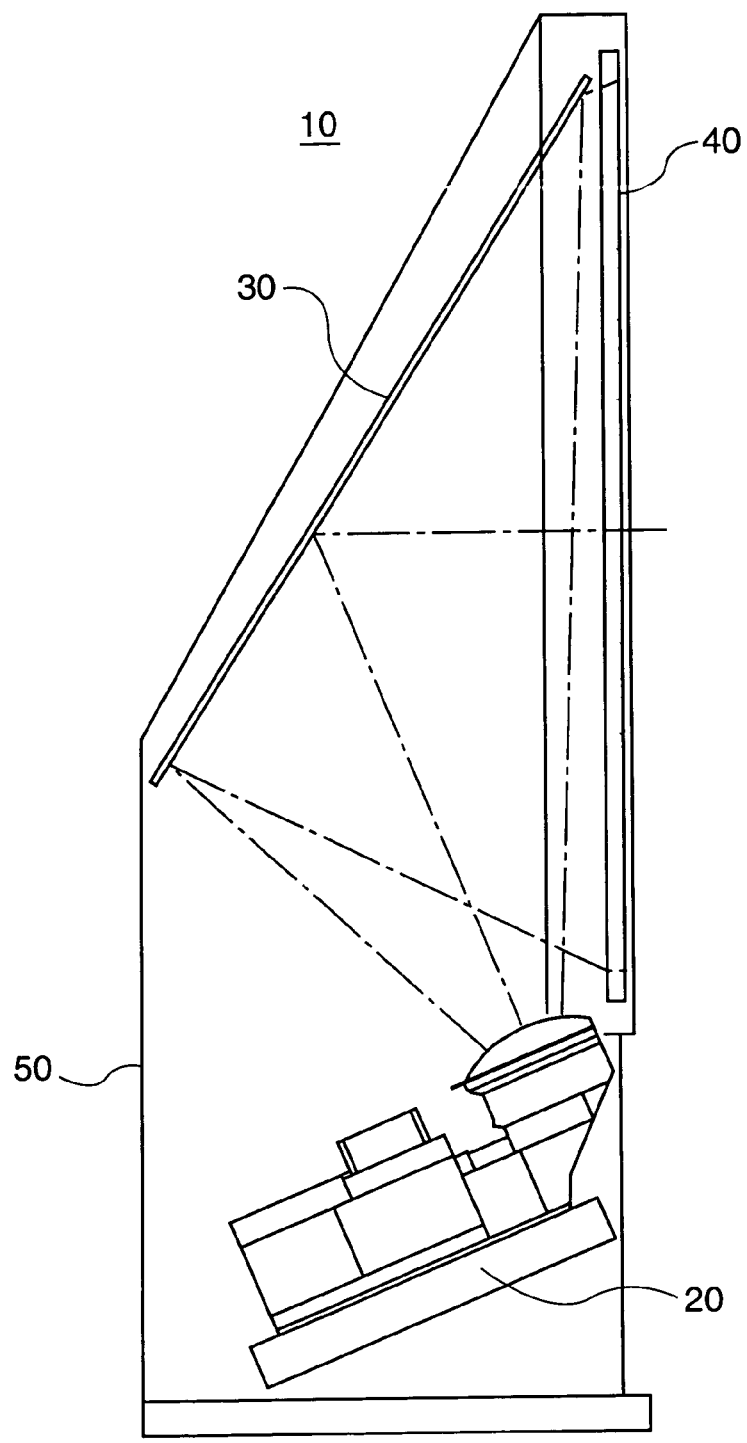
FIG. 8 illustrates the optical system of an exemplary rear projector according to the fourth embodiment of the present invention.

FIG. 7 is an external view of a rear projector according to a fourth embodiment of the present invention. FIG. 8 illustrates the optical system of the rear projector according to the fourth embodiment of the present invention. Referring to FIGS. 7 and 8, the rear projector 10 according to the fourth embodiment can include an optical projecting unit 20, a light-guide mirror 30, and a transmissive screen 40, which can be disposed in a housing 50.

The transmissive screen 40 of the rear projector 10 is the transmissive screen 100 according to the first embodiment. Therefore, there can be provided an excellent rear projector allowing a well-balanced increase in the vertical, horizontal, and oblique viewing angle characteristics for enhancing the viewing angle characteristics.

Figure 9:
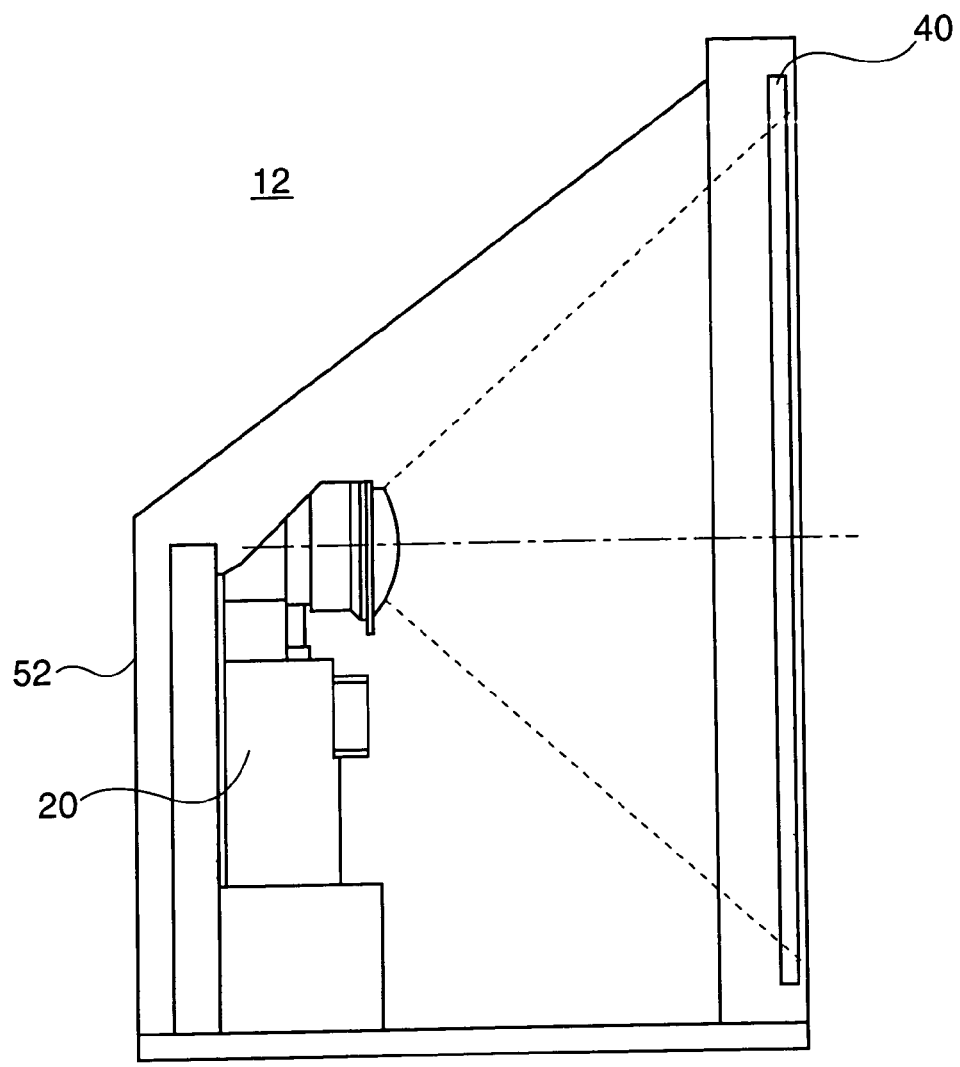
FIG. 9 illustrates the optical system of an exemplary rear projector according to a fifth embodiment of the present invention.
Figure 10:
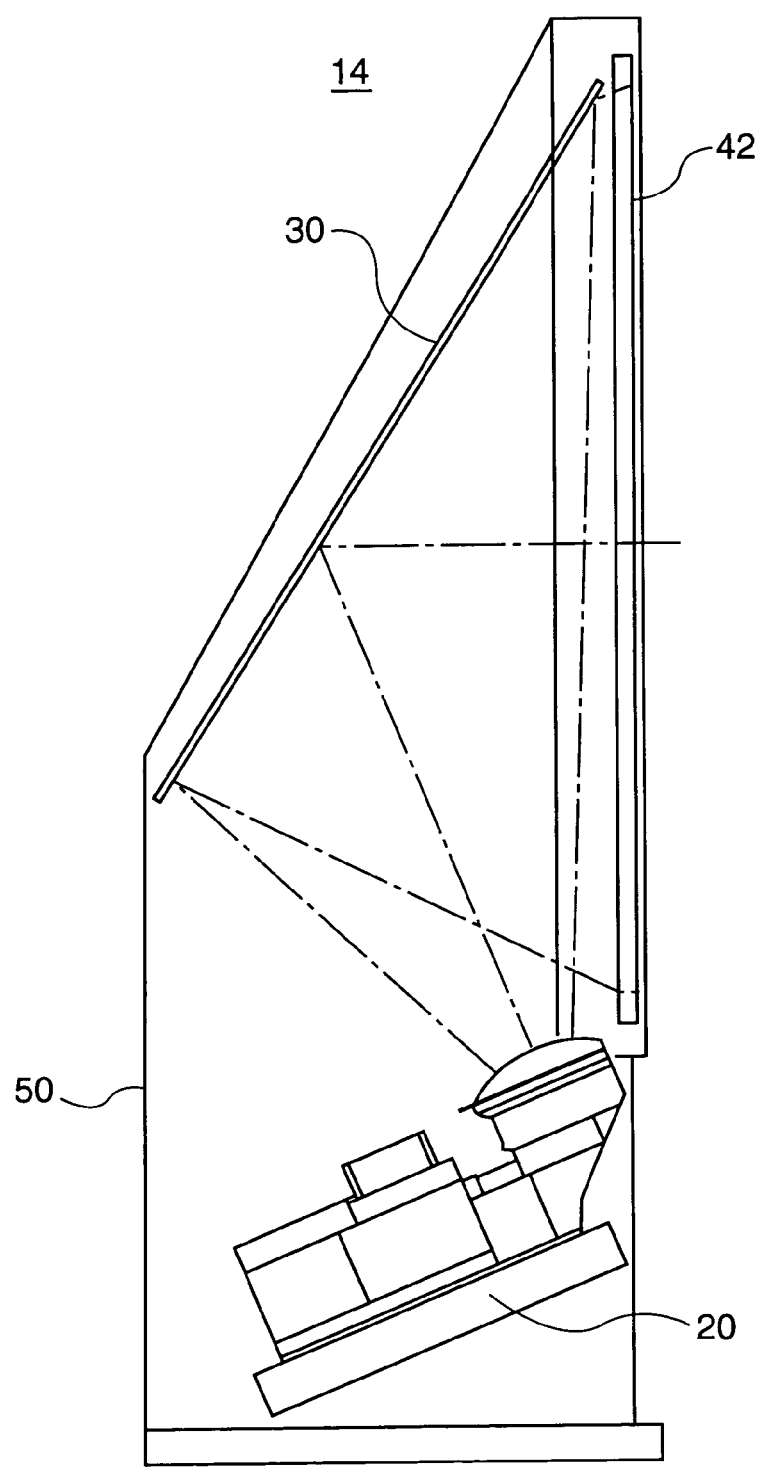
FIG. 10 illustrates the optical system of a conventional rear projector.
Figure 11:
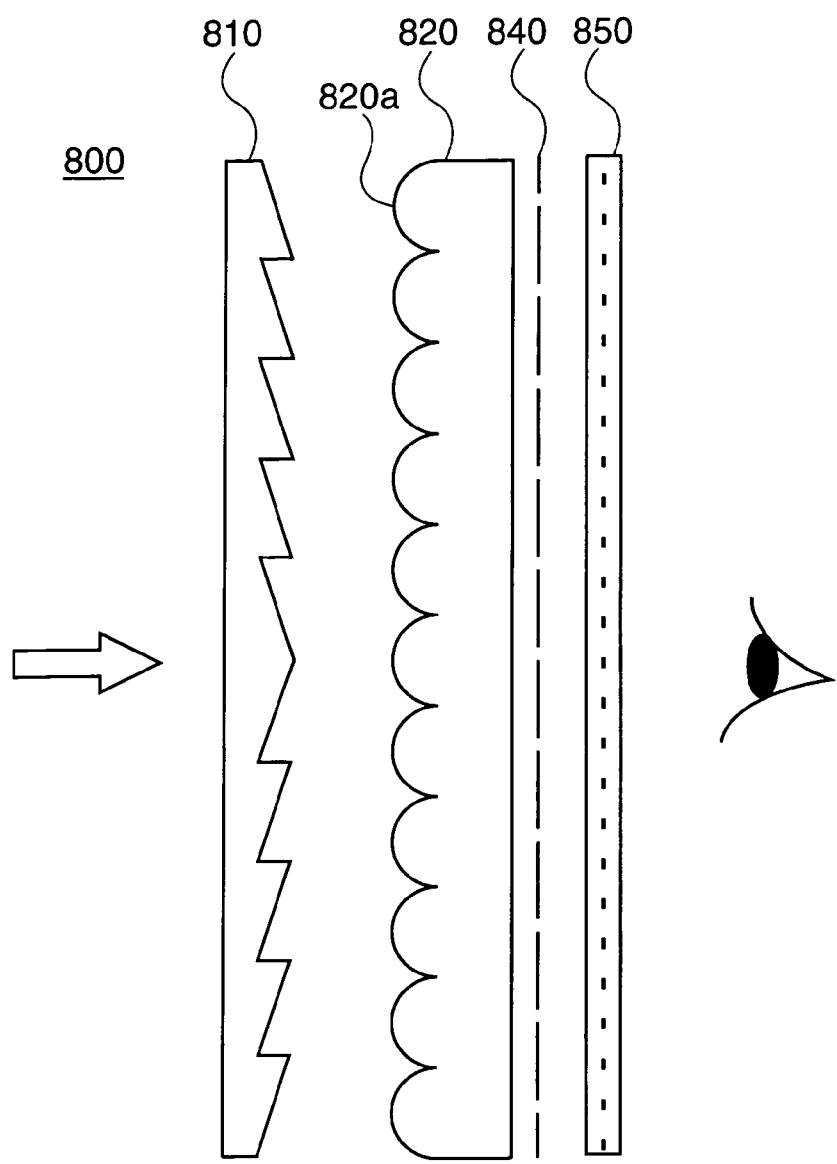
FIG. 11 is a sectional view of the conventional transmissive screen.
Figure 12:
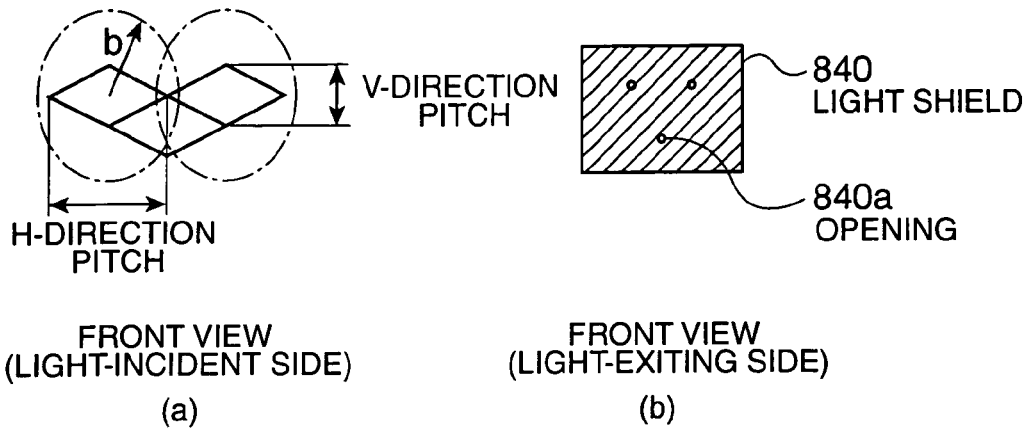
FIG. 12 is a plan view of the conventional transmissive screen.
Figure 13:
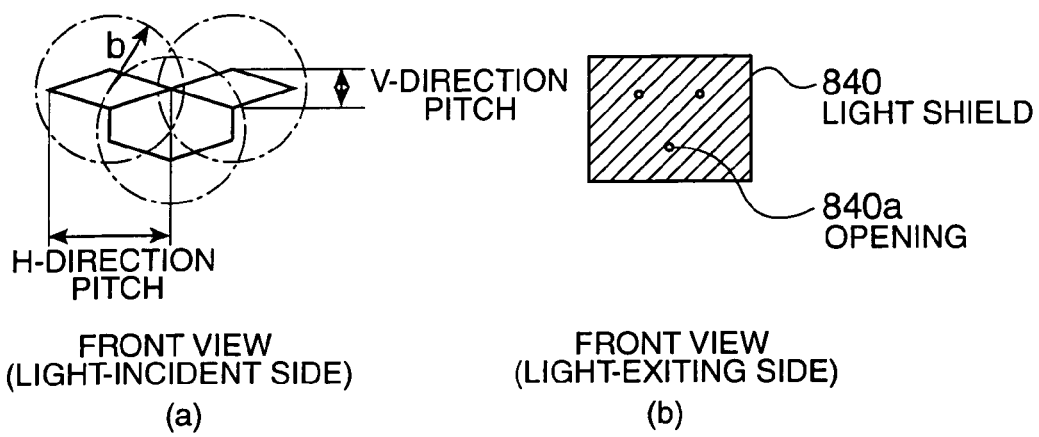
FIG. 13 is a plan view of the conventional transmissive screen.
Figure 14:
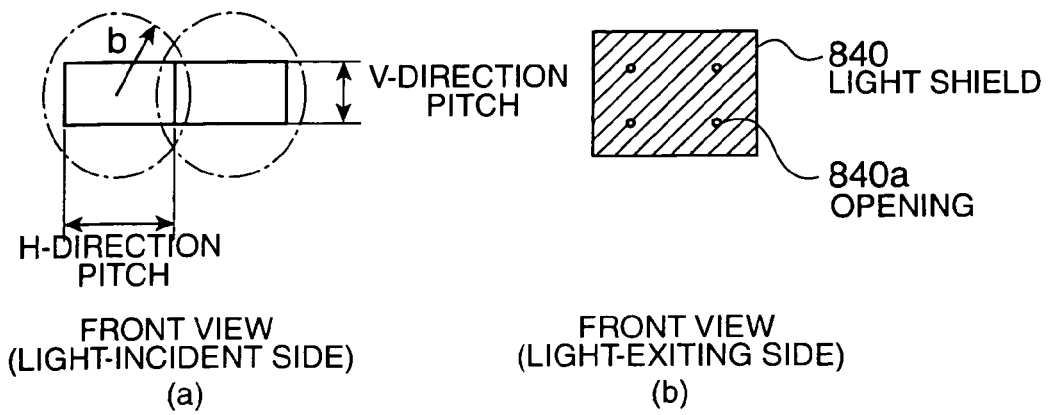
FIG. 14 is a plan view of the conventional transmissive screen.
Figure 15:
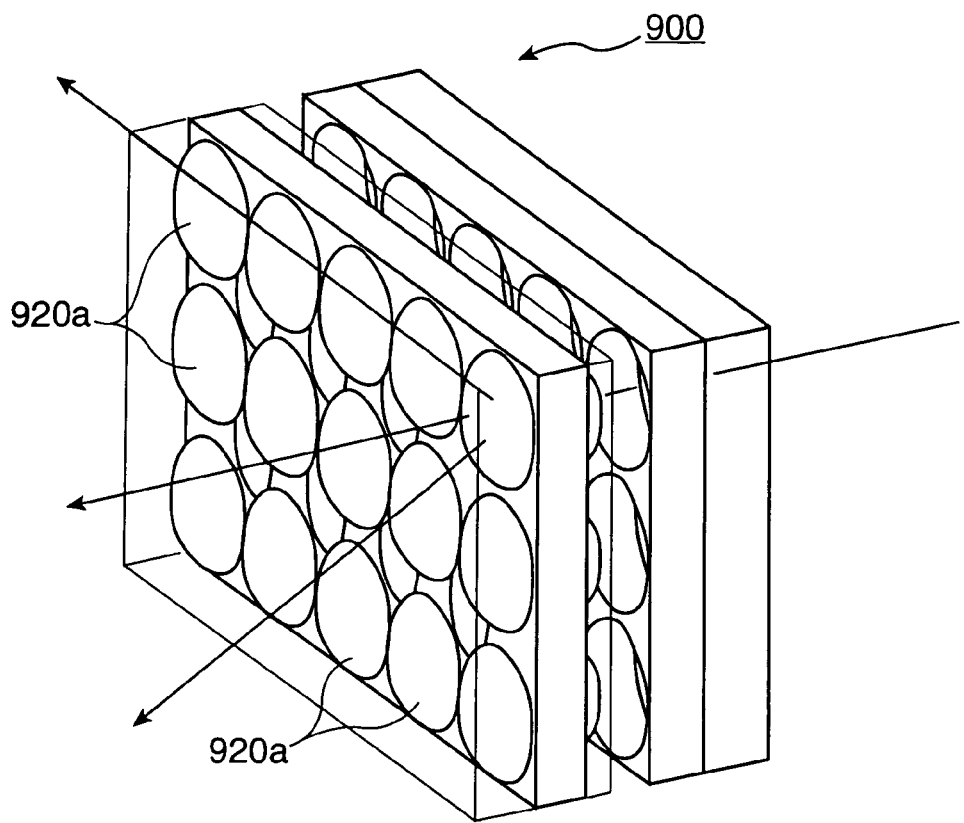
FIG. 15 is a perspective view of another conventional transmissive screen.

FIG. 9 illustrates the optical system of a rear projector according to a fifth embodiment of the present invention. Referring to FIG. 9, the rear projector 12 according to the fifth embodiment can include an optical projecting unit 20 and a transmissive screen 40, which can be disposed in a housing 50.

The presence or absence of a light-guide mirror can distinguish the rear projector 12 according to the fifth embodiment from the rear projector 10 according to the fourth embodiment. That is, the rear projector 10 according to the fourth embodiment can have the light-guide mirror 30, while the rear projector 12 according to the fifth embodiment may not have a light-guide mirror. The absence of a light-guide mirror can eliminate image deterioration attributed to the reflection by the light-guide mirror of an image to be projected, possibly enhancing the display quality of the image projected on the transmissive screen 40.

The transmissive screen 40 of the rear projector 12 is also the transmissive screen 100 according to the first embodiment. Therefore, there can be provided an excellent rear projector allowing a well-balanced increase in the vertical, horizontal, and oblique viewing angle characteristics for enhancing the viewing angle characteristics.

The transmissive screens according to the present invention have been exemplified by the transmissive screen 100 according to the first embodiment, the transmissive screen 200 according to the second embodiment, the transmissive screen 300 according to the third embodiment, the rear projector 10 according to the fourth embodiment, and the rear projector 12 according to the fifth embodiment. However, it should be understood that the transmissive screens of the present invention are not limited to the above embodiments, various modifications are permitted without departing from the spirit and scope of the present invention.

What is claimed is:

1. A transmissive screen, comprising:
a Fresnel lens portion having Fresnel lens components on the light-exiting surface thereof; and
a microlens array portion disposed at a light-exiting surface side of the Fresnel lens portion and having a plurality of microlenses on a light-incident surface thereof, the light-incident surface defining a horizontal direction and a perpendicular direction, the perpendicular direction being perpendicular to the horizontal direction,
the microlenses of the microlens array portion being arrayed in a first direction and a second direction, with adjacent microlenses having common sides, the first direction being rotated by 45° with respect to the horizontal direction, the second direction being perpendicular to the first direction.

2. The transmissive screen according to claim 1, the microlenses having larger horizontal and perpendicular array pitches than oblique array pitches at an angle of 45°.

3. The transmissive screen according to claim 1, further comprising a light diffusing portion that is disposed between the Fresnel lens portion and the microlens array portion.

4. The transmissive screen according to claim 1, further comprising a diffusing sheet that is disposed at a light-exiting surface side of the microlens array portion.

5. The transmissive screen according to claim 4, further comprising a light shield member that is disposed between the microlens array portion and the diffusing sheet, the light shield member having apertures near focal points of the micro lenses.

6. A rear projector, comprising an optical projecting unit and the transmissive screen according to claim 1.

7. The transmissive screen according to claim 1, the plurality of microlenses each having a substantially four-sided shape, adjacent sides within a microlens being perpendicular to each other.

8. A rear projector comprising:
an optical projecting system; and
a screen having a front side and a rear side and having a horizontal direction and a perpendicular direction, light emitted by the optical projecting system being projected onto the screen from the rear side, the screen including:
Fresnel lens components disposed between the front side and the rear side; and
a microlens array disposed between the front side and the Fresnal lens, the microlens array having a plurality of microlenses, the microlenses arrayed in a first direction and a second direction, the first direction being rotated by 45° with respect to the horizontal direction, the second direction being perpendicular to the first direction.

9. The rear projector according to claim 8, the microlenses having larger horizontal and perpendicular array pitches than oblique array pitches at an angle of 45°.

10. The rear projector according to claim 8, further comprising a light diffusing portion that is disposed between the Fresnel lens components and the microlens array.

11. The rear projector according to claim 8, further comprising a diffusing sheet disposed between the front side and the microlens array.

12. The rear projector according to claim 11, further comprising a light shield member that is disposed between the microlens array and the diffusing sheet, the light shield member having apertures near focal points of the microlenses.

13. The rear projector according to claim 8, the plurality of microlenses each having a substantially four-sided shape, adjacent sides within a microlens being perpendicular to each other.

* * * * *